US012623362B1

(12) United States Patent
Fermier et al.

(10) Patent No.: US 12,623,362 B1
(45) Date of Patent: May 12, 2026

(54) ROBOT JOINT WITH WIRE ROUTING FOR ENHANCED DURABILITY AND RELATED TECHNOLOGY

(71) Applicant: Agility Robotics, Inc., Pittsburgh, PA (US)

(72) Inventors: Elise Fermier, Newport, OR (US); Mark Sprenger, Tigard, OR (US); Dylan Thrush, Corvallis, OR (US)

(73) Assignee: Agility Robotics, Inc., Salem, OR (US)

( * ) Notice: Subject to any disclaimer, the term of this patent is extended or adjusted under 35 U.S.C. 154(b) by 0 days.

(21) Appl. No.: 18/819,758

(22) Filed: Aug. 29, 2024

Related U.S. Application Data

(60) Provisional application No. 63/677,217, filed on Jul. 30, 2024.

(51) Int. Cl.
B25J 19/00 (2006.01)
B25J 17/00 (2006.01)

(52) U.S. Cl.
CPC ........... B25J 19/0025 (2013.01); B25J 17/00 (2013.01)

(58) Field of Classification Search
CPC ..... B25J 19/0041; B25J 19/0025; B25J 17/00
USPC ...................................................... 74/490.02
See application file for complete search history.

(56) References Cited

U.S. PATENT DOCUMENTS

| | | | |
|---|---|---|---|
| 4,715,571 A | 12/1987 | Soltow | |
| 5,225,648 A | 7/1993 | Torii | |
| 5,816,736 A | 10/1998 | Kroulik | |
| 9,534,708 B2 | 1/2017 | Cripps, II | |
| 10,603,787 B2 * | 3/2020 | Nakayama | ............. B25J 9/0009 |
| 12,128,552 B2 * | 10/2024 | Grella | ................... F16M 13/022 |
| 2008/0035799 A1 | 2/2008 | Yamamoto | |
| 2009/0146019 A1 * | 6/2009 | Choi | .......................... F16L 3/01 248/62 |
| 2012/0255388 A1 * | 10/2012 | McClosky | ........... B25J 19/0025 74/490.02 |
| 2019/0152071 A1 | 5/2019 | Deister | |
| 2023/0182327 A1 | 6/2023 | Suwa | |

FOREIGN PATENT DOCUMENTS

| | | | | |
|---|---|---|---|---|
| CN | 108237553 A | 7/2018 | | |
| EP | 2684654 A2 | 1/2014 | | |
| JP | S6310091 U | 1/1988 | | |
| JP | H0460692 U | 5/1992 | | |
| JP | H08197482 A | * | 8/1996 | ............. B25J 19/00 |
| JP | 6904556 B2 | 7/2021 | | |
| KR | 20090020880 A | 2/2009 | | |

* cited by examiner

*Primary Examiner* — T. Scott Fix

(57) ABSTRACT

A robot in accordance with at least some embodiments of the present technology includes a leg assembly. The leg assembly defines a kinematic chain and includes a joint, a proximal link proximal to the joint along the kinematic chain, and a distal link distal to the joint along the kinematic chain. The joint is configured to allow for relative rotation between the proximal and distal links about a joint axis. The leg assembly also includes wiring extending between the proximal and distal links. The wiring includes slack and defines a wiring length and a rotational orientation perpendicular to the wiring length. The leg assembly further includes proximal and distal retainers carried by the proximal and distal links, respectively. The proximal and distal retainers are resilient and configured to register rotational orientations of the wiring at proximal and distal end portions, respectively, of the slack.

18 Claims, 11 Drawing Sheets

ROBOT JOINT WITH WIRE ROUTING FOR ENHANCED DURABILITY AND RELATED TECHNOLOGY

CROSS-REFERENCE TO RELATED APPLICATION

This claims the benefit of U.S. Provisional Application No. 63/677,217, filed Jul. 30, 2024. The foregoing application is incorporated herein by reference in its entirety. To the extent the foregoing application or any other material incorporated by reference conflicts with the present disclosure, the present disclosure controls.

TECHNICAL FIELD

The present technology relates to wiring in robots.

BACKGROUND

Much of the work that humans currently perform is amenable to automation using robotics. For example, large numbers of human workers currently focus on executing actions that require little or no reasoning, such as predefined relocations of items and containers at order-fulfillment centers. Such actions may occur millions of times a day at a single order-fulfillment center and billions of times a day across a network of order-fulfillment centers. Human effort would be better applied to more complex tasks, particularly those involving creativity, advanced problem solving, and social interaction. Presently, however, the need for order-fulfillment centers is large and rapidly increasing. Some analysts forecast a shortage of a million or more workers to staff order-fulfillment centers within the next ten to fifteen years. Due to the importance of this field, even small improvements in efficiency can have major impacts on macroeconomic productivity. For at least these reasons, there is a significant and growing need for innovation that supports automating tasks that humans currently perform at order-fulfillment centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
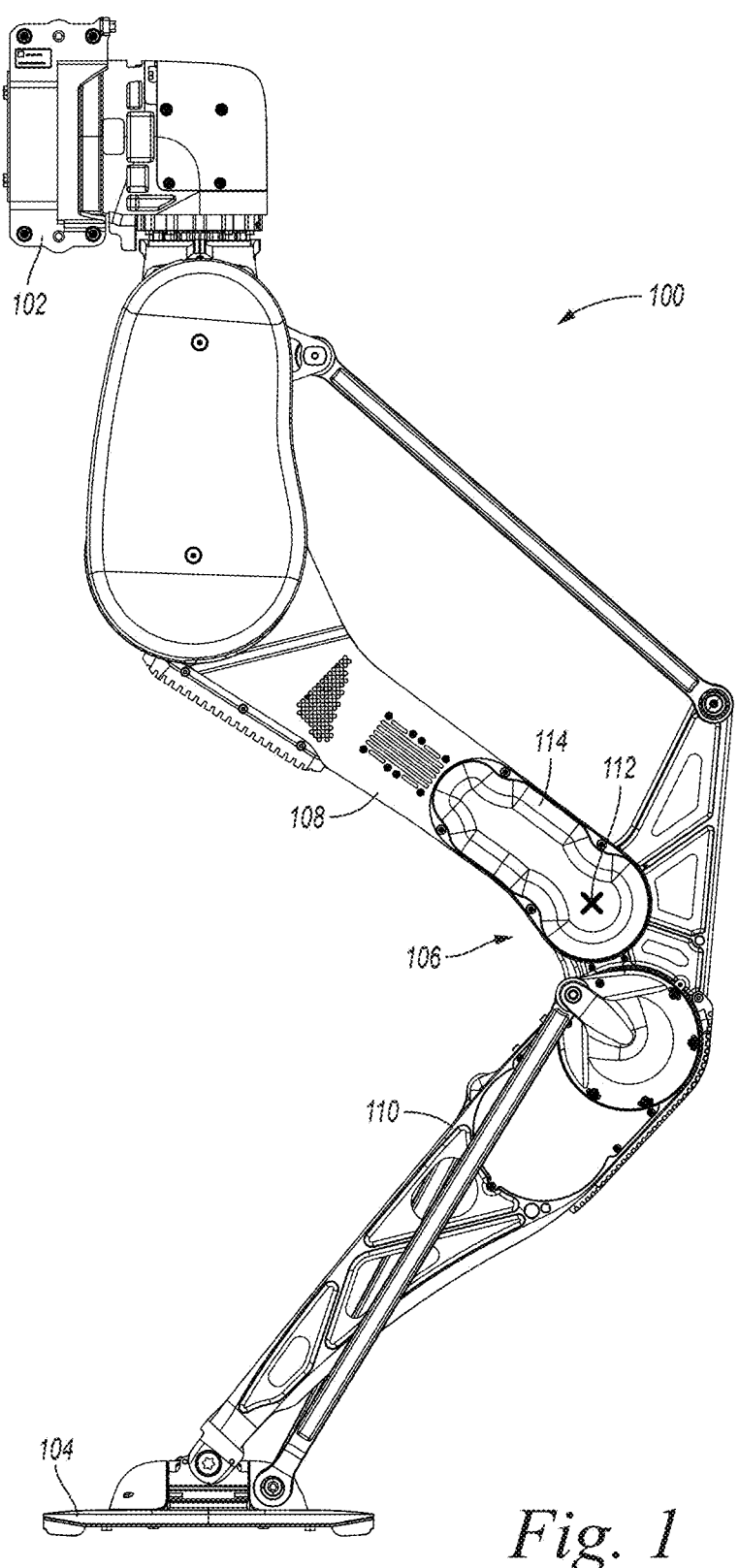
FIG. 1 is a side profile view of a robot leg assembly in accordance with at least some embodiments of the present technology.

Robots typically include wiring for power distribution and communication. For example, wires may electrically connect a centrally located battery to peripherally located actuators. As another example, wires may convey data from peripherally located sensors to centrally located processing circuitry. Complex mobile robots can include dozens of individual electrical components with separate power and communication requirements. In these and other cases, wire routing can be a significant design consideration. Furthermore, wiring that connects components that experience relative movement (e.g., wiring that extends along the length of an articulated arm or leg) may affect robot durability. Some mobile robots, especially those used in industrial and logistics applications, would benefit from extremely high durability. For example, a joint in an industrial or logistics robot may experience millions of motion cycles. Conventional wiring is likely to fail from fatigue after a far lower number of motion cycles. Thus, wiring durability may dictate robot durability. For at least this reason, there is a strong need to improve wiring durability. Such improvement has the potential to make robots more reliable and, therefore, more economical.

Robots and related devices, systems, and methods in accordance with embodiments of the present technology at least partially address one or more problems or limitations associated with conventional technologies. A robot in accordance with a particular embodiment includes wiring that connects links at opposite respective sides of a joint along a kinematic chain. The wiring includes slack that moves in concert with the joint. The robot also includes retainers at opposite respective end portions of the slack. The retainers register rotational orientations of the wiring at these respective end portions of the slack. For example, the retainers can retain constituents of the wiring in a particular configuration. The links and the retainers can include features that cooperate to cause that configuration to have a predetermined relationship from one retainer to the other when the wiring, the retainers, and the links are assembled. This relationship can be selected to promote durability. Furthermore, the retainers can be configured to reduce or eliminate areas of concentrated stress as the wiring moves in concert with the associated joint. Robot wiring in accordance with at least some embodiments of the present technology has been found to be easy to assemble and extremely durable.

The foregoing and other features of devices, systems, and methods in accordance with various embodiments of the present technology are further described below with reference to FIGS. 1-17. Although methods, devices, and systems may be described herein primarily or entirely in the context of leg assemblies of mobile robots, other contexts are within the scope of the present technology. For example, suitable features of described methods, devices, and systems can be implemented in the context of arm assemblies of mobile robots and/or in the context of stationary robots. Furthermore, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Joint Assemblies

Figure 2:
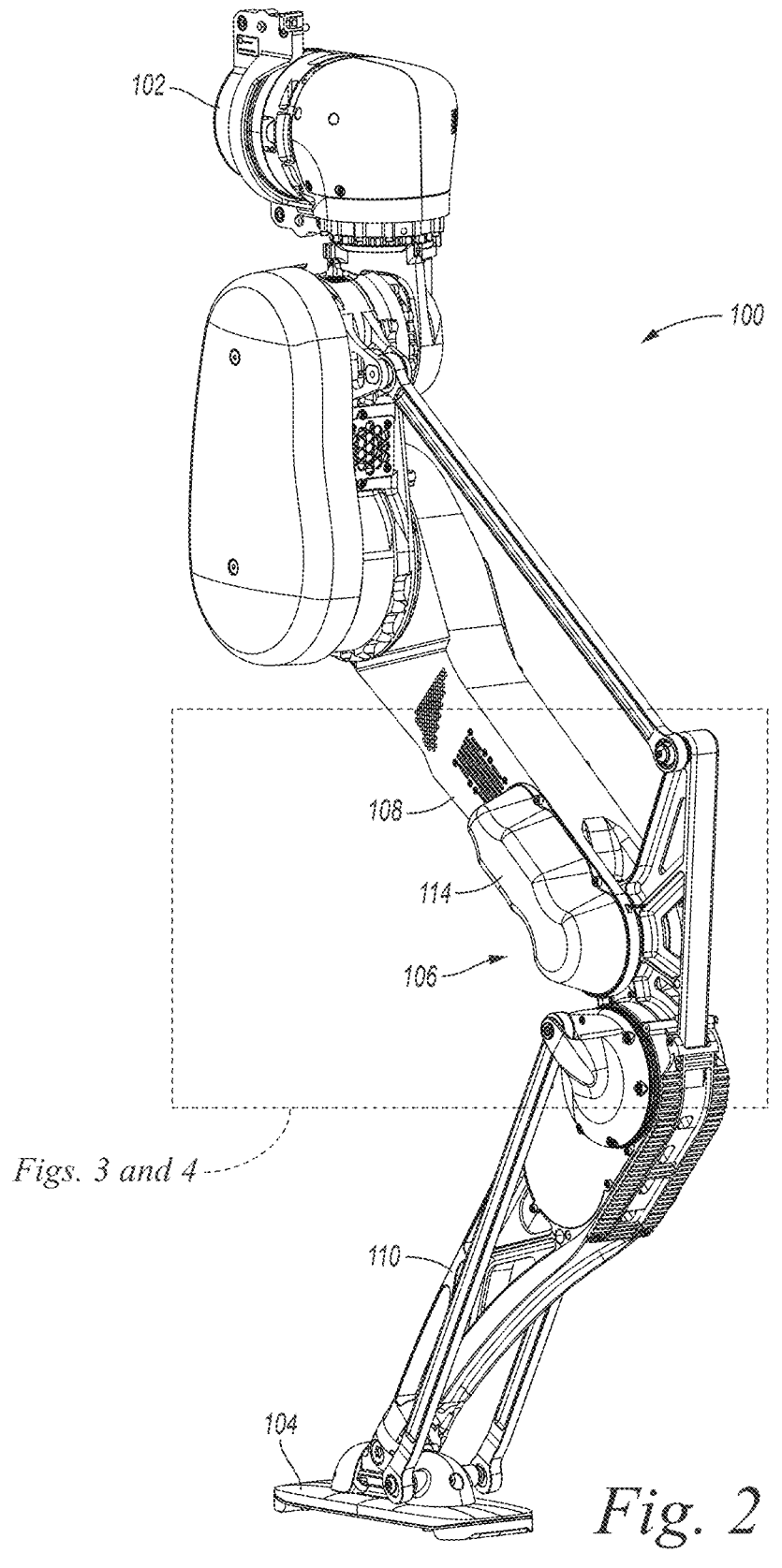
FIG. 2 is a perspective view of the robot leg assembly of FIG. 1.

FIG. 1 is a side profile view of a robot leg assembly 100 in accordance with at least some embodiments of the present technology. FIG. 2 is a perspective view of the robot leg assembly 100. As shown in FIGS. 1 and 2, the robot leg assembly 100 can include a series of links and joints proximally terminating at a hip connector 102 and distally terminating at a foot 104. The robot leg assembly 100 can define a kinematic chain in which these components are distributed. Among the components, the robot leg assembly 100 can include a joint 106, a proximal link 108 and a distal link 110. The proximal and distal links 108, 110 can be proximal and distal, respectively, to the joint 106 along the kinematic chain. The joint 106 can be configured to allow for relative rotation between the proximal and distal links 108, 110 about a joint axis 112. As part of the proximal link 108, the robot leg assembly 100 can include a shell 114 that defines an elongate cavity (not shown). The shell 114 can extend laterally and proximally from the joint 106. Correspondingly, the joint axis 112 can extend through a distal portion of the elongate cavity defined by the shell 114.

Figure 3:
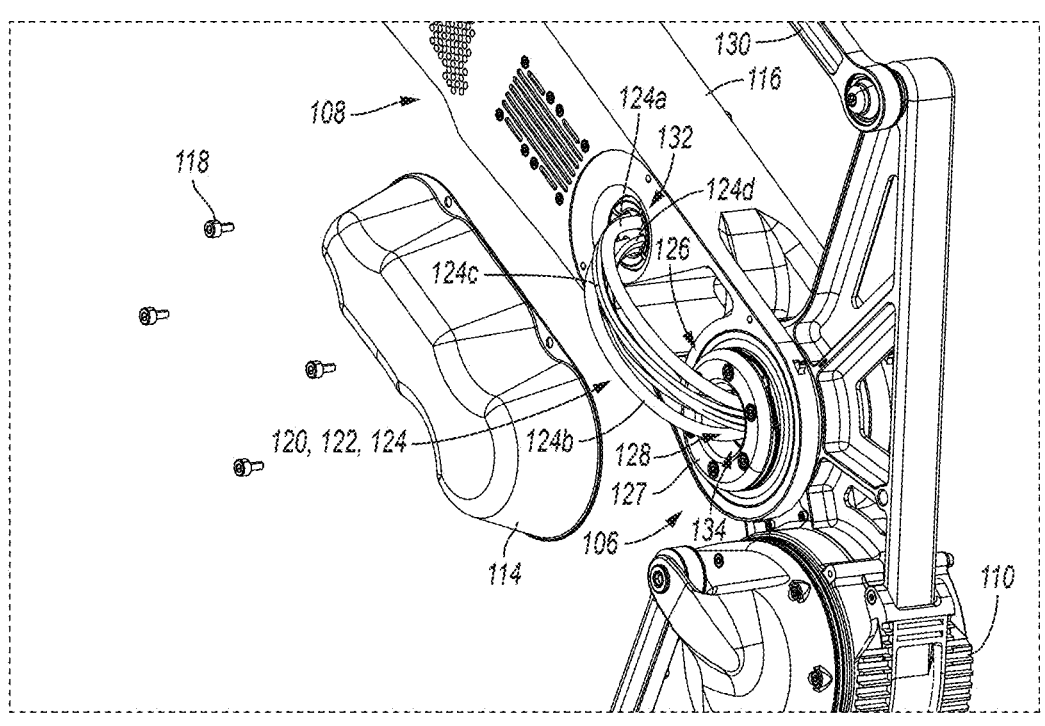
FIG. 3 is an enlarged, exploded view of a portion of the robot leg assembly of FIG. 1.

FIG. 3 is an enlarged, exploded view of a portion of the robot leg assembly 100. In particular, FIG. 3 shows the shell 114 exploded away from other portions of the proximal link 108. As further shown in FIG. 3, the proximal link 108 can include a main housing 116 and screws 118 (one labeled) through which the shell 114 is connected to the main housing 116. The robot leg assembly 100 can include wiring 120 that is elongate and flexible and defines a wiring length and a rotational orientation perpendicular to the wiring length. The wiring 120 can extend along the wiring length between the proximal and distal links 108, 110. The wiring 120 can include slack 122 operably associated with the joint 106. As shown in FIG. 3, the slack 122 can be bow-shaped and disposed within the elongate cavity defined by the shell 114. Stiffness of the wiring 120 can generally maintain the bow shape. In at least some cases, the slack 122 is loosely disposed within the elongate cavity defined by the shell 114. For example, firm connections between the slack 122 and the shell 114 or between the slack 122 and the main housing 116 may be absent. Thus, the shell 114 may protect the slack 122 as it moves in response to movement of the joint 106 while not interfering with this movement of the slack 122. Furthermore, the shell 114 may be configured to remain out of contact with the slack 122 throughout a full range of the slack 122. The slack 122 can extend laterally away from the main housing 116 by different amounts depending on relative positioning of the proximal and distal links 108, 110 during movement of the joint 106. The particular range of motion of the slack 122 can correspond to the architecture of the robot leg assembly 100, the stiffness of the wiring 120, and the length of the slack 122. In some cases, the slack 122 extends laterally away from the main housing 116 by a maximum amount when an angle between the proximal and distal links 108, 110 is at an intermediate point between its maximum and minimum. In other cases, this feature may be absent.

With reference again to FIG. 3, the wiring 120 can include constituents 124 (individually identified as constituents 124a-124d). The constituents 124a-124d can extend along the wiring length and can include one or more wires (not labeled). As shown in FIG. 3, the constituents 124a, 124b can include single wires. As also shown in FIG. 3, the constituents 124c, 124d can include multiple wires. Wires within a given one of the constituents 124a-124d can be loose or interconnected. For example, the constituents 124c, 124d can be ribbon cables. Furthermore, the slack 122 can be radially asymmetrical perpendicular to the wiring length. Alternatively, a counterart of the slack 122 can be radially symmetrical perpendicular to the wiring length. Furthermore, a counterart of the slack 122 can have a different number and/or arrangement of constituents. In the illustrated case, the slack 122 extends proximally from the joint 106. In another case, a counterpart of the slack 122 can extend distally from the joint 106. For example, a counterpart of the proximal retainer 136 can be at the joint axis 112 while a counterpart of the distal retainer 138 is distally spaced apart from the joint axis 112 along a length of the distal link 110. In yet another case, a counterpart of the slack 122 can bridge the joint 106 without extending from the joint. For example, a counterpart of the proximal retainer 136 can be proximally spaced apart from the joint axis 112 along a length of the proximal link 108 while a counterpart of the distal retainer 138 is distally spaced apart from the joint axis 112 along a length of the distal link 110.

Figure 4:
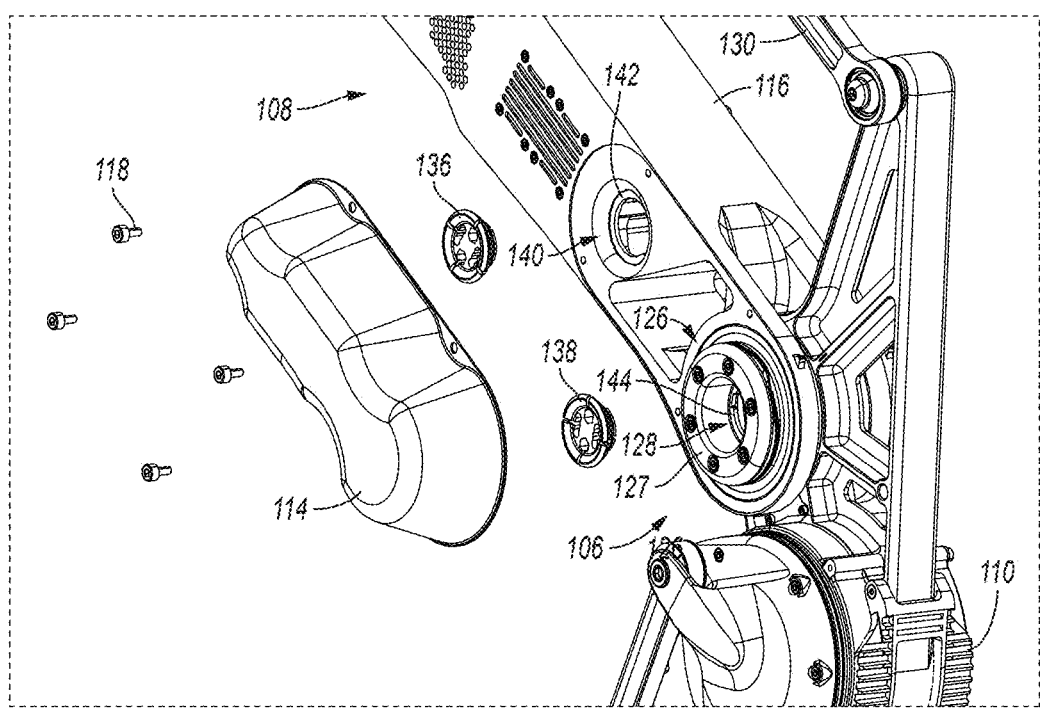
FIG. 4 is a further exploded view corresponding to FIG. 3 with wiring omitted.

With reference again to the illustrated case, the robot leg assembly 100 can include a connector 126 at the joint 106. The connector 126 can be annular and can define a bore 128. In at least some cases, the joint axis 112 extends through the bore 128. For example, the joint axis 112 and the bore 128 can be coaxially aligned. As shown in FIG. 4, the connector 126 can include a cap 127 and another cap (not shown) that together form a bearing pair. The connector 126 can further include a ring bearing (also not shown) secured to the main housing 116 via the bearing pair. The ring bearing can be configured to facilitate low-friction relative rotation between the proximal and distal links 108, 110. The robot leg assembly 100 can include a connecting rod 130 remote from the joint 106. Actuating the joint 106 can be at least primarily via the connecting rod 130. Alternatively or in addition, a counterpart of the robot leg assembly 100 can include an actuator (e.g., a cycloid actuator, a planetary actuator, etc.) at the joint 106. For example, gearing, motor windings, and/or other portions of an actuator at the joint 106 can be annular to define the bore 128. With reference again to the illustrated embodiment, the slack 122 can have a proximal end portion 132 and a distal end portion 134 opposite to the proximal end portion 132. The wiring 120 can extend proximally from the slack 122 within the main housing 116. The wiring 120 can extend distally from the slack 122 through the bore 128 and then continue distally within the distal link 110.

FIG. 4 is a further exploded view corresponding to FIG. 3 with wiring 120 omitted for clarity. With reference to FIGS. 3 and 4 together, the robot leg assembly 100 can include a proximal retainer 136 and a distal retainer 138 carried by the proximal link 108 and by the distal link 110, respectively. The proximal retainer 136 can be configured to register the rotational orientation of the wiring 120 at the proximal end portion 132 of the slack 122. Similarly, the distal retainer 138 can be configured to register the rotational orientation of the wiring 120 at the distal end portion 134 of the slack 122. In at least some cases, the proximal and distal retainers 136, 138 are interchangeable. Further, at least one of the proximal and distal retainers 136, 138 can be an insert. For example, the main housing 116 can define a recess 140 configured to receive the proximal retainer 136. As shown in FIG. 4, the main housing 116 can include an inwardly projecting collar 142 that facilitates securing the proximal retainer 136 at the recess 140. The connector 126 can be configured to receive the distal retainer 138 at the bore 128. As also shown in FIG. 4, the connector 126 can include an inwardly projecting collar 144 that facilitates securing the distal retainer 138 at the bore 128.

Figure 5:
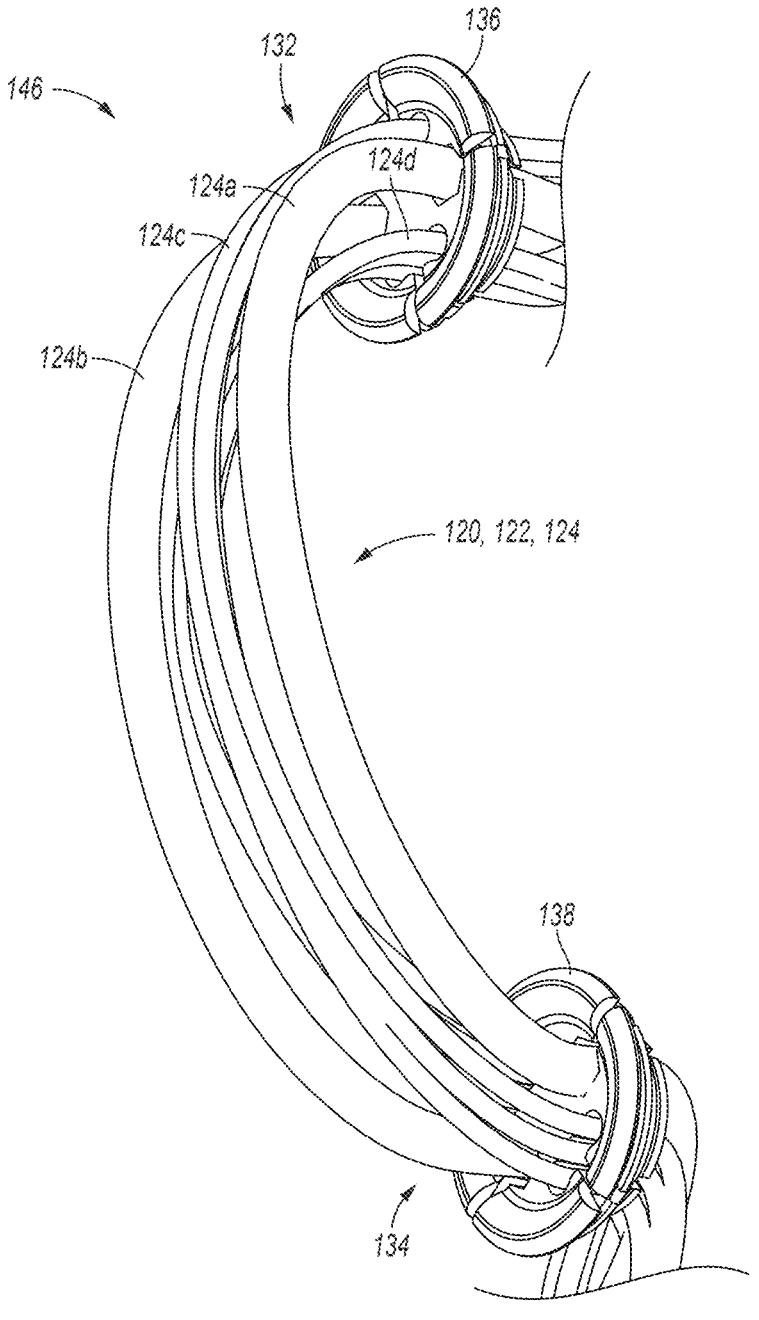
FIG. 5 is a perspective view of a wiring assembly of the robot leg assembly of FIG. 1.
Figures 6, 7, 8:
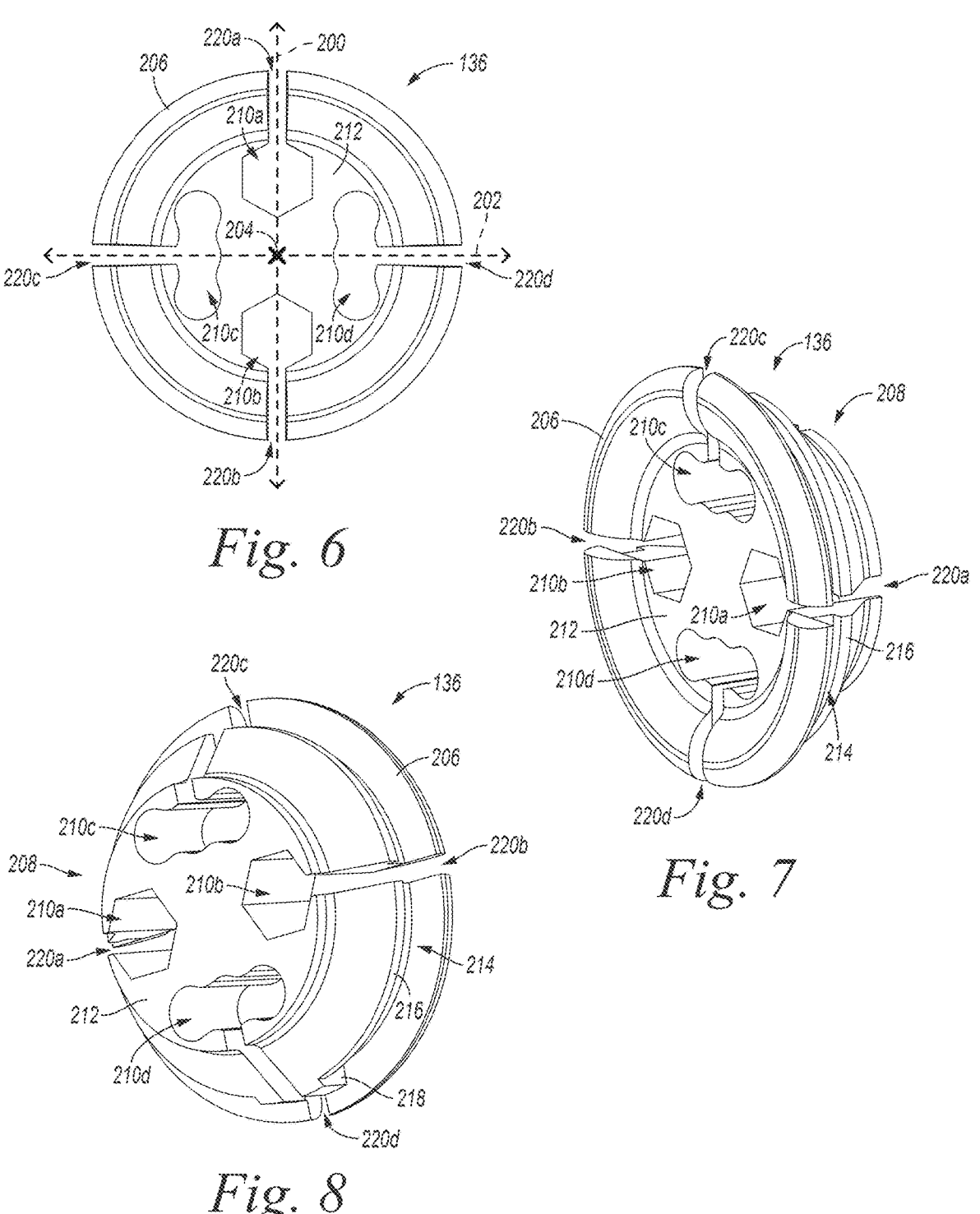
FIG. 6 is a side profile view of a proximal retainer of the robot leg assembly of FIG. 1.
FIGS. 7 and 8 are different respective perspective views of the proximal retainer of the robot leg assembly of FIG. 1.

FIG. 5 is a perspective view of a wiring assembly 146 of the robot leg assembly 100. The wiring assembly 146 can include the slack 122, the proximal retainer 136, and the distal retainer 138. FIG. 6 is a side profile view of the proximal retainer 136. FIGS. 7 and 8 are different respective perspective views of the proximal retainer 136. As discussed above, the proximal and distal retainers 136, 138 can be interchangeable. Accordingly, features, advantages, etc. of the proximal retainer 136 described herein can likewise be applicable to the distal retainer 138. Features of the distal retainer 138 may be referenced herein with reference numbers matching the reference numbers of corresponding features of the proximal retainer 136, but with an appended prime symbol. With reference now to FIGS. 4-8 together, the proximal retainer 136 can be resilient. For example, the proximal retainer 136 can be made at least primarily of a resilient material, such as a material having a Shore A durometer less than 90, within a range from 30 to 80, and/or within a range from 40 to 70. Suitable materials for the proximal retainer 136 include rubber and rubber-like materials, such as natural rubber, nitrile rubber, neoprene, and silicone. The proximal retainer 136 can be made by a molding, printing, or other suitable process. Resilience of the proximal retainer 136 can be useful, for example, to facilitate assembly of the robot leg assembly 100, to reduce or eliminate concentration of stress on the wiring 120 during operation of the joint 106, to reduce or eliminate axial shifting of the wiring 120 during operation of the joint 106, and/or for one or more other reasons.

The proximal retainer 136 can define a first bisecting plane 200, a second bisecting plane 202, and a retainer axis 204 at an intersection of the first and second bisecting planes 200, 202. In at least some cases, the retainer axis 204 is parallel to the wiring length at a portion of the wiring 120 extending through the proximal retainer 136. The proximal retainer 136 can include a flange 206 extending circumferentially around the retainer axis 204. The proximal retainer 136 can further include a plug 208 inwardly positioned toward the retainer axis 204 relative to the flange 206. At the plug 208, the proximal retainer 136 can define a plurality of channels 210 (individually identified as channels 210a-210d). The channels 210a-210d can be configured to retain respective constituents 124a-124d of the wiring 120. Also at the plug 208, the proximal retainer 136 can include a spacer 212 extending between the channels 210a-210d. The flange 206, the plug 208, and the spacer 212 can be integrally formed. Furthermore, the flange 206, the plug 208, and the spacer 212, can be made of the same material.

In the illustrated embodiment, respective cross-sectional perimeters the channels 210a, 210b in a plane perpendicular to the wiring length at the proximal end portion 132 of the slack 122 are polygonal. Also in the illustrated embodiment, respective cross-sectional areas the channels 210c, 210d in a plane perpendicular to the wiring length at the proximal end portion 132 of the slack 122 are elongate. Transverse shape features of the channels 210a-210d can be similar to transverse shape features of the corresponding constituents 124a-124d of the wiring 120. In at least some cases, transverse shape features of the channels 210a-210d are selected to reduce or eliminate concentration of stress on the corresponding constituents 124a-124d of the wiring 120 during operation of the joint 106 and/or to reduce or eliminate axial shifting of the corresponding constituents 124a-124d of the wiring 120 during operation of the joint 106. Furthermore, a distribution of the channels 210a-210d can be selected to reduce or eliminate tangling and/or other problematic interaction between the constituents 124a-124d of the wiring 120 during operation of the joint 106. In at least some cases, the proximal retainer 136 is radially asymmetrical about the retainer axis 204. This can be due to correspondence of the channels 210a-210d with the constituents 124a-124d of the wiring 120 when the wiring 120 is radially asymmetrical about the wiring length and/or due to the presence of the projection 218.

The proximal retainer 136 can define an annular groove 214 at a perimeter of the plug 208 in a plane perpendicular to the retainer axis 204. Furthermore, the proximal retainer 136 can include a lip 216 at one side of the annular groove 214. The flange 206 can be at the other side of the annular groove 214. The proximal retainer 136 can also include a projection 218 extending laterally outward from the groove relative to the retainer axis 204. The proximal retainer 136 can further define a plurality of passages 220 (individually identified as passages 220a-220d). The passages 220a-220d can be configured to allow respective constituents 124a-124d of the wiring 120 to be inserted laterally into the respective channels 210a-210d. The channels 210a-210d can be parallel to the retainer axis 204. As shown in FIG. 3, when the robot leg assembly 100 is assembled, the retainer axis 204 and a retainer axis 204' defined by the distal retainer 138 can be parallel to wiring length at the proximal and distal end portions 132, 134, respectively, of the slack 122. Furthermore, the retainer axes 204, 204' can be within 10 degrees of parallel to the joint axis 112. Still further, the joint axis 112 can extend through the distal retainer 138. In at least some cases, the joint axis 112 and the retainer axis 204' are coaxially aligned. In these and other cases, the wiring length can be within 10 degrees of parallel to the joint axis 112 at the proximal and distal end portions 132, 134, respectively, of the slack 122.

Figures 9, 10:
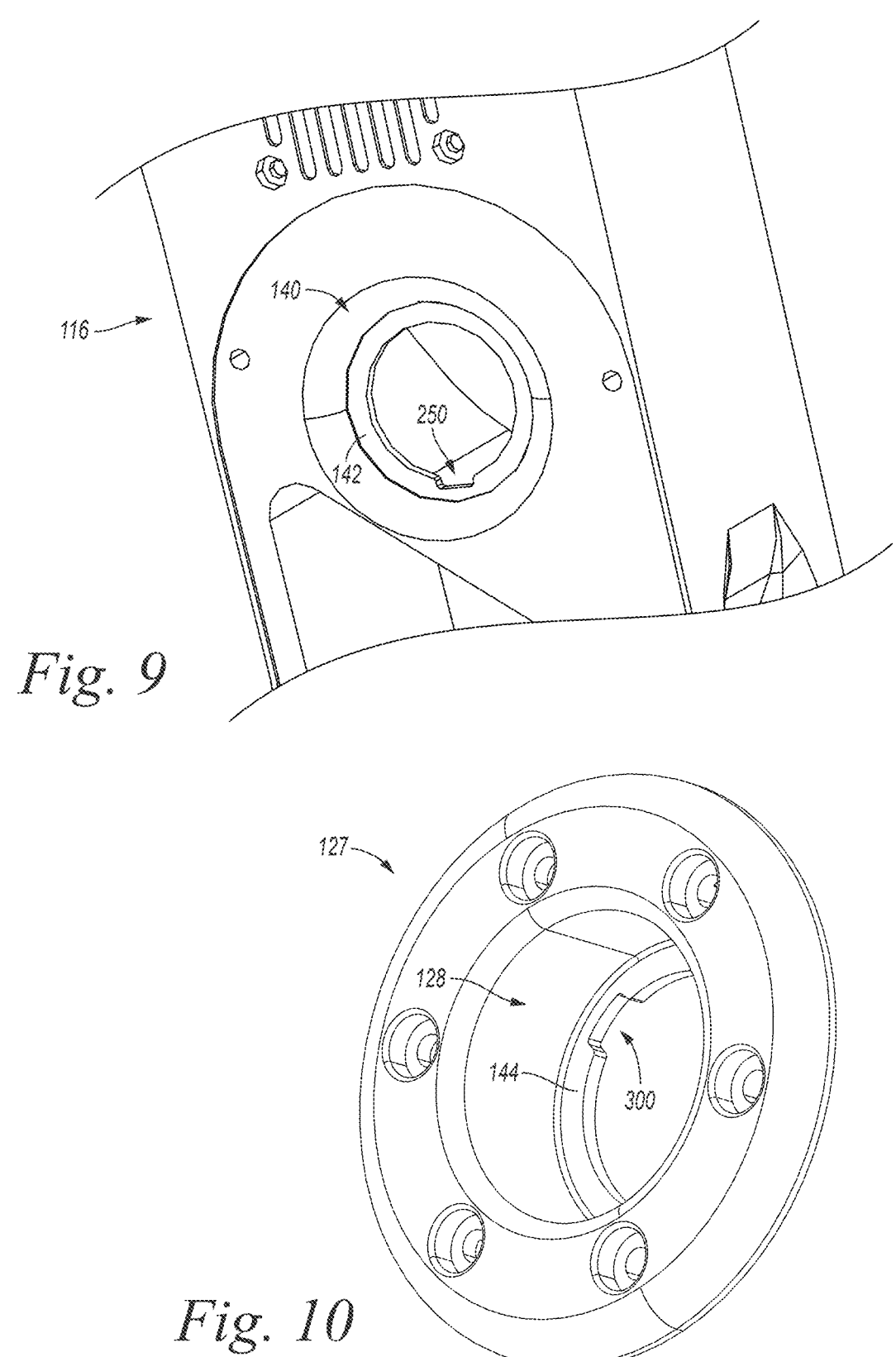
FIG. 9 is a perspective view of a portion of a main housing of a proximal link of the robot leg assembly of FIG. 1.
FIG. 10 is a perspective view of a cap of a connector of the robot leg assembly of FIG. 1.

FIG. 9 is a perspective view of a portion of the main housing 116. FIG. 10 is a perspective view of the cap 127. As shown in FIG. 9, the collar 142 can define a slot 250. Similarly, as shown in FIG. 10, the collar 144 can define a slot 300. With reference to FIGS. 3-10 together, the slot 250 and the projection 218 can act as complementary interlocking features through which the proximal retainer 136 and the proximal link 108 resist relative rotation about the retainer axis 204. In this or another suitable manner, the proximal retainer 136 can be rotationally keyed to the proximal link 108 about the retainer axis 204. Similarly, the slot 300 and a counterpart of the projection 218 can act as complementary interlocking features through which the distal retainer 138 and the distal link 110 resist relative rotation about the retainer axis 204'. In this or another suitable manner, the distal retainer 138 can likewise be rotationally keyed to the distal link 110 about the retainer axis 204'.

Assembling the robot leg assembly 100 can include manually pushing the proximal retainer 136 into the recess 140. This can cause the lip 216 to deform resiliently as the collar 142 moves into the annular groove 214. In at least some cases, the passages 220 enhance the flexibility of the proximal retainer 136 at the lip 216 to facilitate this deformation. As an assembler pushes the proximal retainer 136 into the recess 140, tactile feedback from interaction between the collar 142 and the projection 218 can encourage the assembler to rotate the proximal retainer 136 to a desired orientation. Moreover, interaction between the projection 218 and the collar 142 can cause an unseated state of the proximal retainer 136 at the recess 140 to be readily apparent to the assembler until the slot 250 and the projection 218 are aligned. Furthermore, when the proximal retainer 136 is fully seated at the recess 140, interaction between the projection 218 and the collar 142 can reduce or prevent relative rotation between the proximal retainer 136 and the proximal link 108 about the retainer axis 204 during operation of the joint 106. The same or similar features can apply to the distal retainer 138 and the slot 300.

Figure 11:
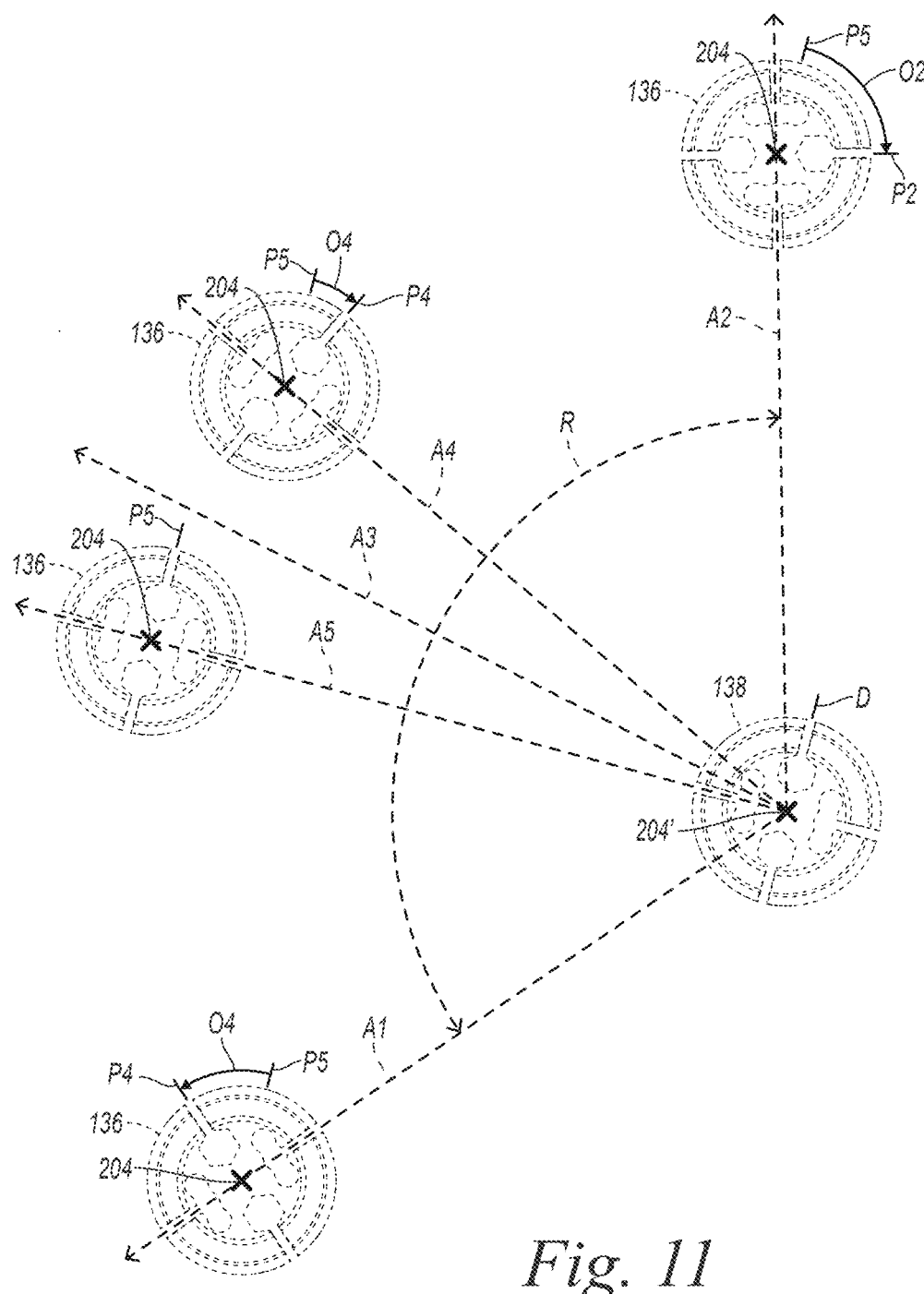
FIG. 11 is a side profile view of the proximal retainer and a distal retainer of the robot leg assembly of FIG. 1 when the proximal link and a distal link of the robot leg assembly are at different relative angles.

FIG. 11 is a side profile view of the proximal retainer 136 and the distal retainer 138 when the proximal and distal links 108, 110 are at different relative angles represented by dashed lines extending outwardly from the retainer axis 204' and intersecting the retainer axis 204. The joint 106 can be configured to allow for relative rotation between the proximal and distal links 108, 110 within a range (R). The range (R) can extend from a minimum relative angle (A1) between the proximal and distal links 108, 110 to a maximum relative angle (A2) between the proximal and distal links 108, 110. In FIG. 11, relative angle (A3) corresponds to a midpoint of the range (R). The relative angle (A4) corresponds to the positions of the proximal and distal links 108, 110 illustrated in FIGS. 1-4. FIG. 11 also shows a relative angle (A5) at which the slack 122 has a minimum torsional stress perpendicular to the wiring length. FIG. 11 still further indicates respective rotational orientations of the wiring 120 perpendicular to the wiring length at the proximal end portion 132 of the slack 122 (P1, P2, P4, P5) and at the distal end portion 134 of the slack 122 (D). The rotational orientations (P1, P2, P4, P5) correspond to the relative angles (A1, A2, A4, A5), respectively. The rotational orientation (D) is the same at the relative angles (A1, A2, A3, A4, A5), respectively.

In at least some cases, the rotational orientation (P5) differs from rotational orientation D by 180 degrees. As discussed above, the corresponding relative angle A5 can be one at which the slack 122 has a minimum torsional stress perpendicular to the wiring length. The 180 degrees difference can be associated with a bow shape of the wiring 120 in the absence of twisting between the proximal and distal end portions 132, 134 of the slack 122. FIG. 11 also shows a level of offset (O1, O2, O4) from the rotational orientation (P5) at the relative angles (A1, A2, A4), respectively. The level of offset (O1, O2, O4) can correspond to a degree of twisting of the wiring 120 at the relative angles (A1, A2, A4), respectively. Over millions of cycles, this twisting can cause failure of the wiring 120. Features of the joint 106 can be selected to reduce twisting of the wiring 120, thereby enhancing the durability of the robot leg assembly 100.

As shown in FIG. 11, the state at which the slack 122 has a minimum torsional stress perpendicular to the wiring length and/or the rotational orientation (P5) differs from rotational orientation D by 180 degrees can occur when the relative angle (A5) is at an intermediate point between the minimum relative angle (A1) and the midpoint relative angle (A3). This and/or other aspects of the relationship between the rotational orientation (P) and the relative angle (A) can correspond to relative positions of the slots 250, 300. In at least some cases, the relative positions of the slots 250, 300 are selected based at least partially on an expectation for movement of the joint 106 within the range (R). For example, rather than having minimum torsional stress occur at a midpoint of the entire range (R), the relative positions of the slots 250, 300 can be selected to cause the minimum torsional stress to occur at a midpoint of a functional range representing typical movement of the joint 106. In the case of the robot leg assembly 100, the functional range can be a range associated with ambulation. Other portions of the range (R), in contrast, can be associated with less common movements of the joint 106, such as movements associated with occasional height extension for reaching. With other joints, such as arm joints, the targeted functional range may be different. Moreover, the functional range may depend on the particularities of an application. Also, the relationship between the respective rotational orientations of the wiring 120 perpendicular to the wiring length at the proximal and distal end portions end portion 132, 134 of the slack 122 can be different than in the illustrated case.

Figures 12, 13, 14:
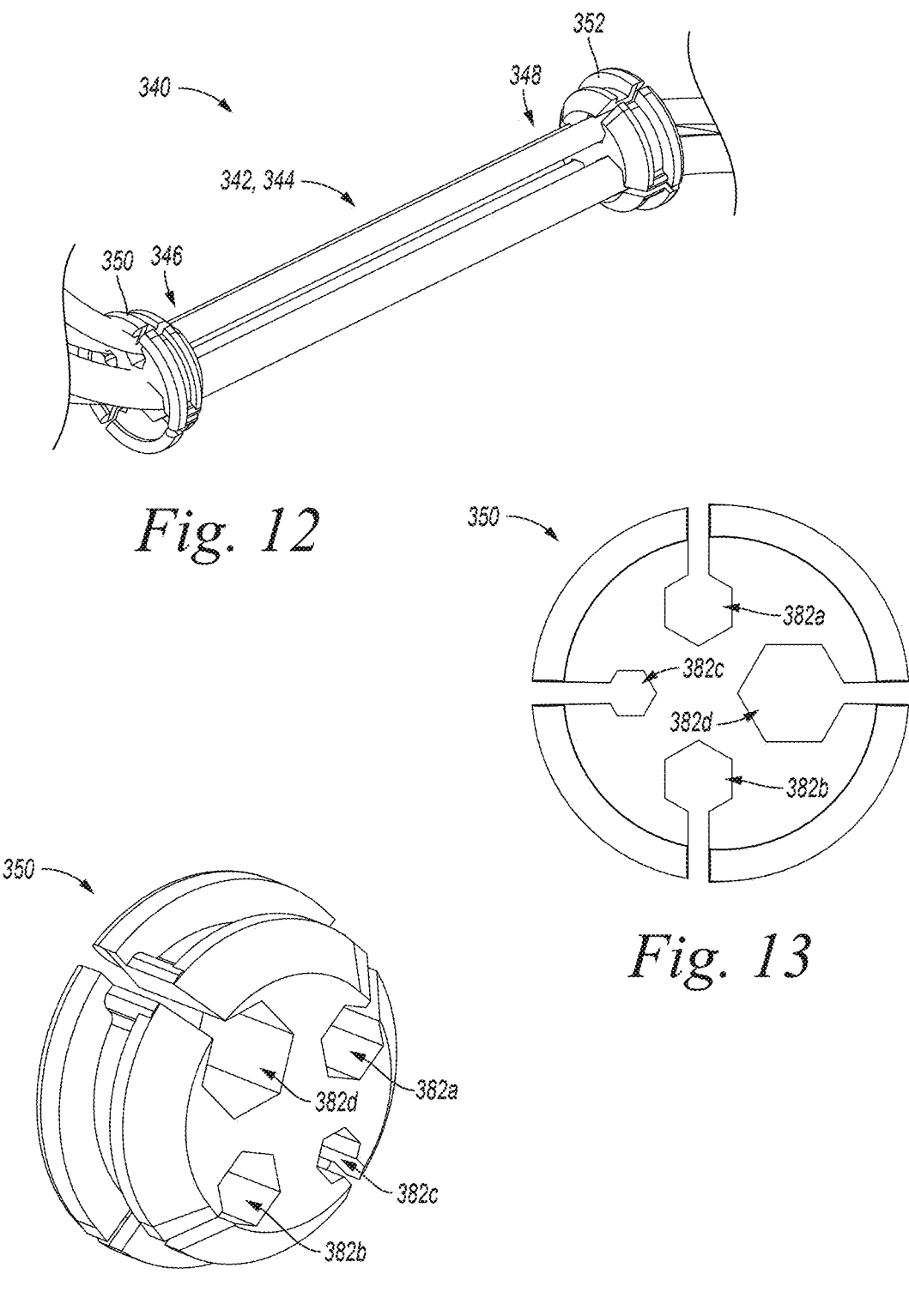
FIG. 12 is a perspective view of another wiring assembly of the robot leg assembly of FIG. 1.
FIGS. 13 and 14 are a side profile view and a perspective view, respectively, of another proximal retainer of the robot leg assembly of FIG. 1.

FIG. 12 is a perspective view of another wiring assembly 340 of the robot leg assembly 100. Any suitable features described for one of the wiring assemblies 146, 340 can likewise apply to the other. With reference now to FIGS. 1-12 together, the wiring assembly 340 can be present at the hip connector 102. The wiring assembly 340 can include wiring 342 defining a wiring length and having slack 344 with a proximal end portion 346 and a distal end portion 348 spaced apart from one another along the wiring length. The wiring assembly 340 can further include a proximal retainer 350 and a distal retainer 352 at the proximal and distal end portions 346, 348, respectively, of the slack 344. Rather than being bow-shaped, the slack 344 in the illustrated case is generally straight. Relatedly, respective retainer axes of the proximal and distal retainers 350, 352 can be coaxial. Other slack shapes and retainer alignments in accordance with embodiments of the present technology are also possible. For example, a counterpart of the slack 344 can be serpentine (e.g., s-shaped), curved, coiled, etc. Such slack shapes and retainer alignments can correspond to geometries, obstructions, motion requirements, etc. of corresponding joints. With reference again to FIG. 12, the proximal and distal retainers 350, 352 can register the rotational orientations of the wiring 342 at the proximal and distal end portions 346, 348, respectively, of the slack 344 in a manner similar to that the of the proximal and distal retainers 350, 352 (FIGS. 3 and 4) with respect to the slack 122. Also similarly, the proximal and distal retainers 350, 352 can be keyed to other structures of the hip connector 102 such that rotational orientations corresponding to minimum torsional stress on the wiring 342 perpendicular to the wiring length occur at when the hip connector 102 is at a suitable intermediate rotational state rather than at a minimum or maximum of its rotational range.

Figure 15:
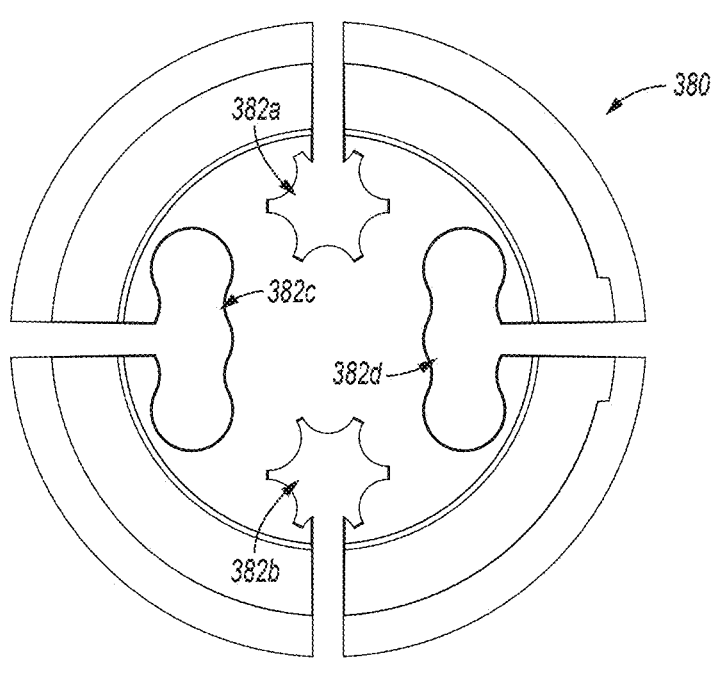
FIGS. 15 and 16 are a side profile view and a perspective view, respectively, of yet another proximal retainer of a robot leg assembly in accordance with at least some embodiments of the present technology.
Figure 16:
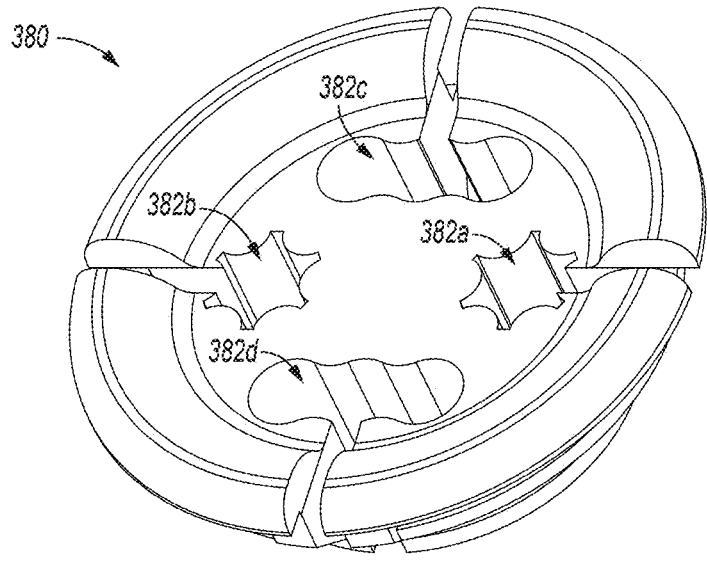

FIGS. 13 and 14 are a side profile view and a perspective view, respectively, of the proximal retainer 350. As with the proximal and distal retainers 136, 138, the proximal and distal retainers 350, 352 can be interchangeable. The proximal retainer 350 can define channels 352 (individually identified as channels 352a-352d). FIGS. 15 and 16 are a side profile view and a perspective view, respectively, of a proximal retainer 380 of a robot leg assembly in accordance with at least some embodiments of the present technology. The proximal retainer 380 can likewise define channels 382 (individually identified as channels 382a-382d). Other than the sizes and/or shapes of the channels 352a-352d, 382a-382d, features of the proximal retainers 350, 380 can be the same or similar to features of the proximal retainer 136 described above.

As discussed above in the context of the proximal retainer 136, the shapes of the channels 210a-210d can be useful to reduce or eliminate concentration of stress on the wiring 120 during operation of the joint 106 and/or to reduce or eliminate axial shifting of the wiring 120 during operation of the joint 106. Other channel shapes can likewise have these and/or other functional advantages. In proximal retainer 350, the channels 352a, 352b are lobed rather than polygonal. The shapes of individual lobes at the channels 352a, 352b can be selected to change the force with which the proximal retainer 350 grips the constituents 124a, 124b of the wiring 120 via the channels 352a, 352b. In other embodiments, counterparts of the channels 210a-210d, 352a-352d, 382a-382d can have still other shapes. For example, counterparts of any of the channels 210a-210d, 352a-352d, 382a-382d can include gripping features other than lobes, such as fins parallel to or perpendicular to the retainer axis 204. Lobes, fins, polygonal sides, and/or other channel features can be present in any suitable quantity. For example, counterparts of any of the channels 210a-210d, 352a-352d, 382a-382d can be polygonal with 3, 4, 5, 6, 7, 8, etc. sides. Similarly, counterparts of any of the channels 210a-210d, 352a-352d, 382a-382d can be lobed with 3, 4, 5, 6, 7, 8, etc. lobes.

Examples of Robot Systems

Figure 17:
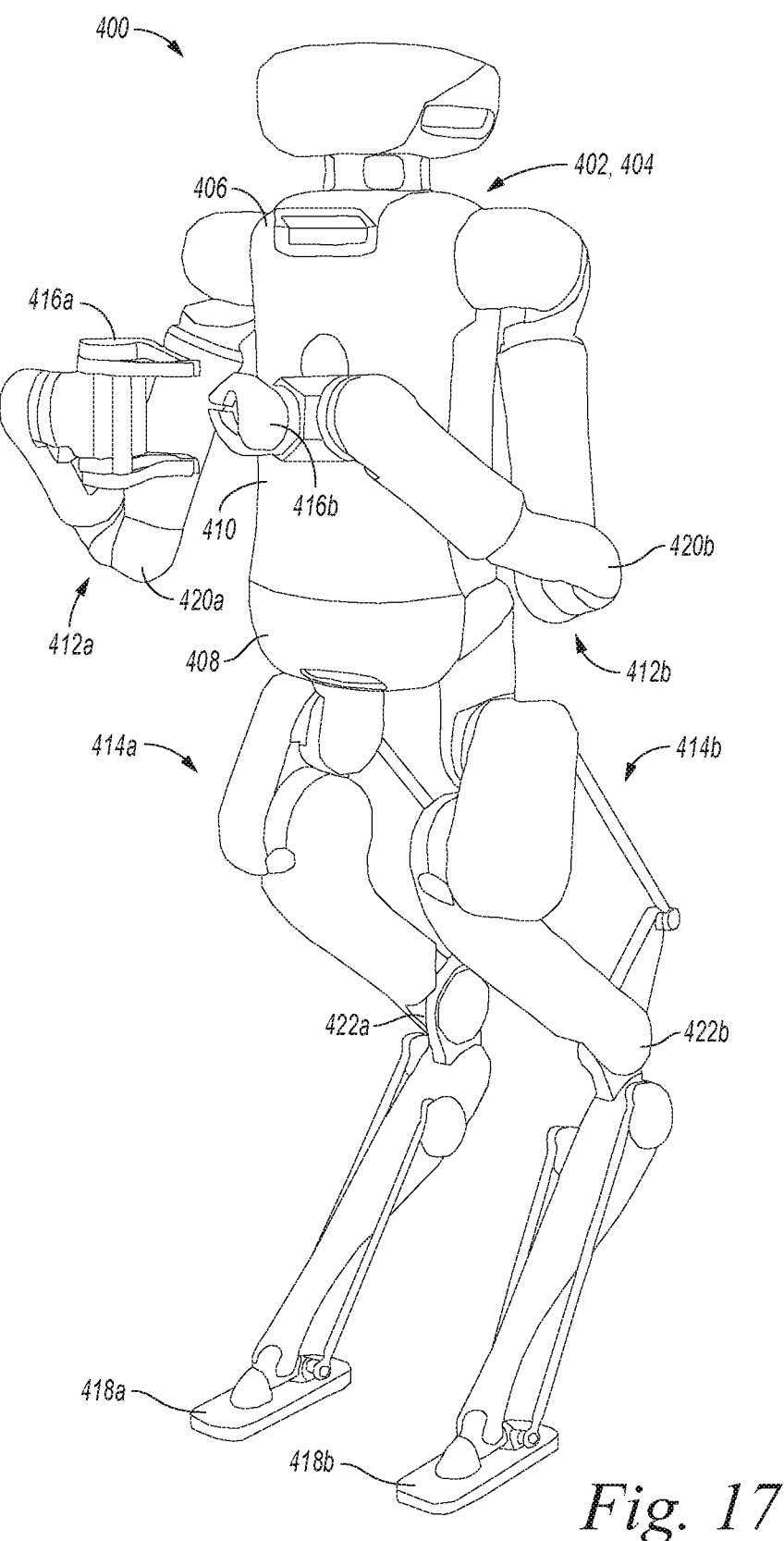
FIG. 17 is a perspective view of a mobile robot in accordance with at least some embodiments of the present technology.

FIG. 17 is a perspective view of a mobile robot 400 in accordance with at least some embodiments of the present technology. As shown in FIG. 17, the mobile robot 400 can include structures resembling human anatomy with respect to the features, positions, and/or other characteristics of such structures. In at least some cases, the mobile robot 400 defines a midsagittal plane (not labeled) about which the mobile robot 400 is bilaterally symmetrical. In these and other cases, the mobile robot 400 can be configured for bipedal locomotion similar to that of a human. Counterparts of the mobile robot 400 can have other suitable forms and features. For example, a counterpart of the mobile robot 400 can have a non-humanoid form, such as a canine form, an insectoid form, an arachnoid form, or a form with no animal analog. Furthermore a counterpart of the mobile robot 400 can be asymmetrical or have symmetry other than bilateral. Still further, a counterpart of the mobile robot 400 can be configured for non-bipedal locomotion. For example, a counterpart of the mobile robot 400 can be configured for another type of legged locomotion (e.g., quadrupedal locomotion, octopedal locomotion, etc.) and/or non-legged locomotion (e.g., wheeled locomotion, continuous-track locomotion, etc.).

The mobile robot 400 can include a centrally disposed body 402 through which other structures of the mobile robot 400 are interconnected. As all or a portion of the body 402, the mobile robot 400 can include a torso 404 having a superior portion 406, an inferior portion 408, and an intermediate portion 410 therebetween. The mobile robot 400 can further include articulated appendages carried by the torso 404. Among these articulated appendages, the mobile robot 400 can include arms 412a, 412b and legs 414a, 414b. In at least some cases, the mobile robot 400 is configured to manipulate objects via the arms 412a, 412b, such as bimanually. In these and other cases, the mobile robot 400 can be configured to ambulate via the legs 414a, 414b, such as bipedally. The arms 412a, 412b and the legs 414a, 414b can define kinematic chains. The kinematic chains corresponding to the arms 412a, 412b, for example, can provide at least five degrees of freedom, such as exactly five or exactly six degrees of freedom. In these and other cases, the kinematic chains corresponding to the legs 414a, 414b can provide at least four degrees of freedom, such as exactly four, exactly five, or exactly six degrees of freedom. As parts of the arms 412a, 412b, the mobile robot 400 can include end effectors 416a, 416b at distalmost portions of the corresponding kinematic chains. Similarly, as parts of the legs 414a, 414b, the mobile robot 400 can include feet 418a, 418b at distalmost portions of the corresponding kinematic chains.

At the individual articulations of the arms 412a, 412b and legs 414a, 414b, the mobile robot 400 can include a joint and a corresponding actuator. At least one of these joints can correspond to the joint 106 or another joint in accordance with at least some embodiments of the present technology. For example, the mobile robot 400 can include a joint with wiring features in accordance with at least some embodiments of the present technology at joints of the arms 412a, 412b, at joints of the legs 414a, 414b, and/or elsewhere. In an example, the mobile robot 400 can include elbow joints 420a, 420b at or near midpoints along lengths of the respective arms 412a, 412b. Similarly, the mobile robot 400 can include knee joints 422a, 422b at or near midpoints along lengths of the respective legs 414a, 414b. Any or all of the elbow joints 420a, 420b and the knee joints 422a, 422b can include wiring features in accordance with at least some embodiments of the present technology. Wiring features in accordance with at least some embodiments of the present technology can be useful in many other locations in addition or alternatively. Furthermore, the mobile robot 400 is merely one example of a system in which features of at least some embodiments of the present technology can be implemented.

Examples of Methods

Figure 18:
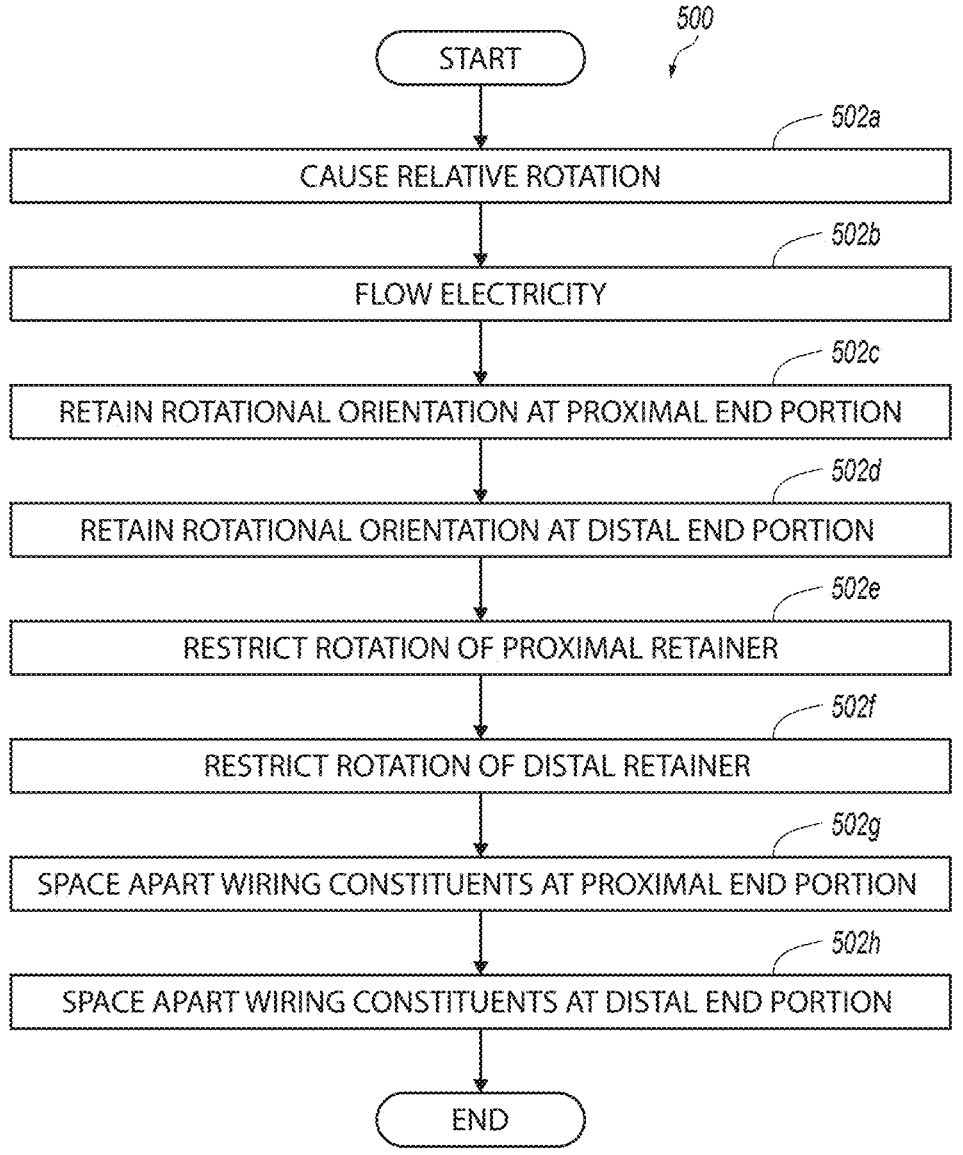
FIG. 18 is a block diagram corresponding to a method in accordance with at least some embodiments of the present technology.

FIG. 18 is a block diagram corresponding to a method 500 in accordance with at least some embodiments of the present technology. With reference to FIGS. 1-18 together, the method 500 can include causing relative rotation between the proximal and distal links 108, 110 via the joint 106 (block 502a). The relative rotation can be about the joint axis 112 and can be within the range (R). When the joint 106 is at one of the knee joints 422a, 422b, causing the relative rotation can occur while the mobile robot 400 ambulates via the corresponding one of the legs 414a, 414b. In addition or alternatively, when the joint 106 is at one of the elbow joints 420a, 420b, causing the relative rotation can occur while the mobile robot 400 manipulates an object via the corresponding one of the arms 412a, 412b. The method 500 can further include flowing electricity between the proximal and distal links 108, 110 via the wiring 120 (block 502b). This can occur while the wiring 120 bows laterally away from the joint 106 and/or while the wiring 120 extends through the bore 128. Furthermore, flowing electricity between the proximal and distal links 108, 110 via the wiring 120 can occur while the wiring length is within 10 degrees of parallel to the joint axis 112 at the distal end portion 134 of the slack 122. Similarly, flowing electricity between the proximal and distal links 108, 110 via the wiring 120 can occur while the wiring length is within 10 degrees of parallel to the joint axis 112 at the proximal end portion 132 of the slack 122

The method 500 can further include retaining (e.g., resiliently retaining) the rotational orientation of the wiring 120 at the proximal end portion 132 of the slack 122 (block 502c). This can occur via the proximal retainer 136 and while causing the relative rotation between the proximal and distal links 108, 110. Similarly, the method 500 can include retaining (e.g., resiliently retaining) the rotational orientation of the wiring 120 at the distal end portion 134 of the slack 122 (block 502d). This can occur via the distal retainer 138 and while causing the relative rotation between the proximal and distal links 108, 110. The method 500 can also include causing the respective rotational orientations of the wiring 120 at the proximal and distal end portions 132, 134 of the slack 122 to differ by 180 degrees and/or causing the slack 122 to have a minimum torsional stress perpendicular to the wiring length. This or these features can occur while causing the relative rotation and when a relative angle between the proximal and distal links 108, 110 is an intermediate angle between a minimum and a midpoint of the range (R).

The method 500 can also include carrying the proximal retainer 136 at the recess 140 while resiliently retaining the rotational orientation of the wiring 120 at the proximal end portion 132 of the slack 122. Relatedly, the method 500 can include carrying the distal retainer 138 at the bore 128 or another recess of the distal link 110 while resiliently retaining the rotational orientation of the wiring 120 at the distal end portion 134 of the slack 122. While resiliently retaining the rotational orientation of the wiring 120 at the proximal end portion 132 of the slack 122, the method 500 can include restricting rotation of the proximal retainer 136 relative to the proximal link 108 (block 502e). This can be via complementary interlocking features of the proximal retainer 136 and the proximal link 108. While resiliently retaining the rotational orientation of the wiring 120 at the distal end portion 134 of the slack 122, the method 500 can include restricting rotation of the distal retainer 138 relative to the distal link 110 (block 502f). This can be via complementary interlocking features of the distal retainer 138 and the distal link 110.

The method 500 can still further include resiliently spacing apart the constituents 124a-124d of the wiring 120 at the proximal end portion 132 of the slack 122 via the spacer 212 of the proximal retainer 136 (block 502g). Similarly, the method 500 can include resiliently spacing apart the constituents 124a-124d of the wiring 120 at the distal end portion 134 of the slack 122 via the spacer 212 of the distal retainer 138 (block 502h). In at least some cases, resiliently spacing apart the constituents 124a-124d of the wiring 120 includes resiliently retaining the constituents 124a-124d of the wiring 120 at different respective ones of the channels 210a-210d while the spacer 212 extends between the channels 210a-210d. In at least some cases, the constituents 124a-124d of the wiring 120 include two ribbon cables. Resiliently retaining these ribbon cables can occur while respective elongate dimensions of respective cross-sectional areas of the ribbon cables are aligned with one another. For example, the elongate dimensions can be within 10 degrees of parallel to one another at the proximal end portion 132 of the slack 122 and/or at the distal end portion 134 of the slack 122.

CONCLUSION

This disclosure is not intended to be exhaustive or to limit the present technology to the precise forms disclosed herein.

Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms. References herein to any of receiving, determining, or generating information in accordance with various embodiments of the present technology encompass, when feasible, the others of receiving, determining, and generating the information and indicate that such operations can occur at least partially via the relevant computing subsystem.

Directional terms, such as "upper," "lower," "front," "back," "vertical," and "horizontal," may be used herein to express and clarify the relationship between various structures. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects.

Finally, it should be noted that various particular features, structures, and operations of the embodiments described herein may be combined in any suitable manner in additional embodiments in accordance with the present technology.

We claim:

1. A method comprising:

causing, via a joint of a robot, relative rotation between a proximal link of the robot and a distal link of the robot, wherein the robot defines a kinematic chain including the joint, wherein the proximal link is proximal to the joint along the kinematic chain, wherein the distal link is distal to the joint along the kinematic chain, wherein the robot includes a connector at the joint, wherein the connector defines a bore, wherein the joint axis extends through the bore, and wherein the wiring extends through the bore;

flowing electricity between the proximal and distal links via wiring of the robot, wherein the wiring includes slack operably associated with the joint, and wherein the wiring defines a wiring length and a rotational orientation perpendicular to the wiring length;

resiliently retaining the rotational orientation of the wiring at a proximal end portion of the slack while causing the relative rotation; and resiliently retaining the rotational orientation of the wiring at a distal end portion of the slack while causing the relative rotation.

2. The method of claim 1, wherein:

resiliently retaining the rotational orientation of the wiring at the proximal end portion of the slack includes resiliently retaining the rotational orientation of the wiring at the proximal end portion of the slack via a proximal retainer of the robot carried by the proximal link; and resiliently retaining the rotational orientation of the wiring at the distal end portion of the slack includes resiliently retaining the rotational orientation of the wiring at the distal end portion of the slack via a distal retainer of the robot carried by the distal link.

3. The method of claim 2, further comprising:

restricting rotation of the proximal retainer relative to the proximal link via complementary proximal interlocking features of the proximal retainer and the proximal link while resiliently retaining the rotational orientation of the wiring at the proximal end portion of the slack; and restricting rotation of the distal retainer relative to the distal link via complementary distal interlocking features of the distal retainer and the distal link while resiliently retaining the rotational orientation of the wiring at the distal end portion of the slack.

4. The method of claim 2, further comprising:

resiliently spacing apart wiring constituents of the wiring at the proximal end portion of the slack via a resilient proximal spacer of the proximal retainer; and resiliently spacing apart wiring constituents of the wiring at the distal end portion of the slack via a resilient distal spacer of the distal retainer.

5. The method of claim 4, wherein:

the wiring includes wires;

the proximal retainer defines a plurality of proximal channels;

resiliently spacing apart the wires at the proximal end portion of the slack includes resiliently retaining the wires at different respective proximal channels of the plurality of proximal channels while the resilient proximal spacer extends between the different respective proximal channels of the plurality of proximal channels;

the distal retainer defines a plurality of distal channels; and resiliently spacing apart the wires at the distal end portion of the slack includes resiliently retaining the wires at different respective distal channels of the plurality of distal channels while the resilient distal spacer extends between the different respective distal channels of the plurality of distal channels.

6. The method of claim 5, wherein:

the wires include a ribbon cable;

resiliently retaining the wires includes resiliently retaining the ribbon cable at one of the proximal channels having an elongate cross-sectional area in a dimension perpendicular to the wiring length at the proximal end portion of the slack; and resiliently retaining the wires further includes resiliently retaining the ribbon cable at one of the distal channels having an elongate cross-sectional area in a dimension perpendicular to the wiring length at the distal end portion of the slack.

7. The method of claim 6, wherein:

the ribbon cable is a first ribbon cable;

the wires include a second ribbon cable;

the one of the proximal channels is a first one of the proximal channels;

the one of the distal channels is a first one of the distal channels;

resiliently retaining the wires includes resiliently retaining the second ribbon cable at a second one of the proximal channels having an elongate cross-sectional area in a dimension perpendicular to the wiring length at the proximal end portion of the slack; and resiliently retaining the wires further includes resiliently retaining the second ribbon cable at a second one of the distal channels having an elongate cross-sectional area in a dimension perpendicular to the wiring length at the distal end portion of the slack.

8. The method of claim 5, wherein:

resiliently retaining the wires includes resiliently retaining a given one of the wires at one of the proximal channels having a polygonal cross-sectional perimeter in a plane perpendicular to the wiring length at the proximal end portion of the slack; and resiliently retaining the wires further includes resiliently retaining the given one of the wires at one of the distal channels having a polygonal cross-sectional perimeter in a plane perpendicular to the wiring length at the distal end portion of the slack.

9. The method of claim 2, further comprising:

carrying the proximal retainer at a recess of the proximal link while resiliently retaining the rotational orientation of the wiring at the proximal end portion of the slack; and carrying the distal retainer at a recess of the distal link while resiliently retaining the rotational orientation of the wiring at the distal end portion of the slack.

10. The method of claim 1, wherein:

the wiring has a first rotational orientation perpendicular to the wiring length at the proximal end portion of the slack;

the wiring has a second rotational orientation perpendicular to the wiring length at the distal end portion of the slack; and the method further comprises causing the first and second rotational orientations to differ by 180 degrees while causing the relative rotation.

11. The method of claim 10, wherein:

causing the relative rotation includes causing the relative rotation within a range extending from a minimum angle between the proximal and distal links to a maximum angle between the proximal and distal links; and causing the first and second rotational orientations to differ by 180 degrees includes causing the first and second rotational orientations to differ by 180 degrees when the relative rotation is at an intermediate angle between the minimum angle and a midpoint of the range.

12. The method of claim 1, wherein:

the joint is at a leg of the robot; and causing the relative rotation includes causing the relative rotation while the robot ambulates via the leg.

13. The method of claim 1, wherein:

causing the relative rotation includes causing the relative rotation within a range extending from a minimum angle between the proximal and distal links to a maximum angle between the proximal and distal links; and the method further comprises causing the slack to have a minimum torsional stress perpendicular to the wiring length when the relative rotation is at an intermediate angle between the minimum angle and a midpoint of the range.

14. The method of claim 1, wherein:

causing the relative rotation includes causing the relative rotation about a joint axis; and flowing the electricity includes flowing the electricity while the wiring length is within 10 degrees of parallel to the joint axis at the distal end portion of the slack.

15. The method of claim 14, wherein flowing the electricity includes flowing the electricity while the wiring length is within 10 degrees of parallel to the joint axis at the proximal end portion of the slack.

16. The method of claim 1, wherein flowing the electricity includes flowing the electricity while the slack bows laterally away from the joint.

17. The method of claim 1, wherein flowing the electricity includes flowing the electricity via the wiring at the bore.

18. The method of claim 1, wherein:

the proximal link includes a shell that defines an elongate cavity; and causing the relative rotation includes causing the relative rotation while the slack is within the cavity.

\* \* \* \* \*